(12) United States Patent
Tamai et al.

(10) Patent No.: US 7,389,837 B2
(45) Date of Patent: Jun. 24, 2008

(54) ELECTRIC POWER CONTROL SYSTEM FOR A HYBRID VEHICLE

(75) Inventors: Goro Tamai, West Bloomfield, MI (US); Michael G. Reynolds, Troy, MI (US)

(73) Assignee: General Motors Corporation, Detroit, MI (US)

( * ) Notice: Subject to any disclaimer, the term of this patent is extended or adjusted under 35 U.S.C. 154(b) by 236 days.

(21) Appl. No.: 10/691,332

(22) Filed: Oct. 20, 2003

(65) Prior Publication Data

US 2005/0082095 A1    Apr. 21, 2005

(51) Int. Cl.
    *B60K 1/00* (2006.01)
(52) U.S. Cl. .................. 180/65.2; 180/65.3; 290/31
(58) Field of Classification Search ............ None
    See application file for complete search history.

(56) References Cited

U.S. PATENT DOCUMENTS

| | | | | |
|---|---|---|---|---|
| 4,438,342 A * | 3/1984 | Kenyon | ................ | 290/45 |
| 4,687,983 A * | 8/1987 | Beyn | ................ | 322/28 |
| 5,334,926 A * | 8/1994 | Imaizumi | ................ | 320/104 |
| 5,717,310 A * | 2/1998 | Sakai et al. | ................ | 307/10.1 |
| 5,793,189 A * | 8/1998 | Kawaguchi et al. | ................ | 322/28 |
| 5,883,496 A * | 3/1999 | Esaki et al. | ................ | 320/132 |
| 6,275,004 B1 * | 8/2001 | Tamai et al. | ................ | 320/118 |
| 6,295,487 B1 * | 9/2001 | Ono et al. | ................ | 701/22 |
| 6,472,790 B2 * | 10/2002 | Rose, Sr. | ................ | 310/184 |
| 6,522,105 B2 * | 2/2003 | Kodama et al. | ................ | 320/155 |
| 6,616,569 B2 * | 9/2003 | Hoang et al. | ................ | 477/3 |
| 6,674,180 B2 * | 1/2004 | Gale et al. | ................ | 290/7 |
| 6,718,927 B2 * | 4/2004 | Goetze et al. | ................ | 123/179.3 |
| 6,833,784 B1 * | 12/2004 | Ishii et al. | ................ | 340/426.1 |
| 6,919,648 B2 * | 7/2005 | Bolz et al. | ................ | 290/40 C |
| 2003/0118891 A1 * | 6/2003 | Saito et al. | | |

* cited by examiner

*Primary Examiner*—Christopher Bottorff

(57) ABSTRACT

A vehicle powertrain control system including an electric motor drive system, a first battery coupled to the electric motor drive system, an electronically controlled switched coupled to the first battery, a second battery coupled to the electronically controlled switch, and where the electronically controlled switch applies power from the second battery to supplement the first battery.

11 Claims, 1 Drawing Sheet

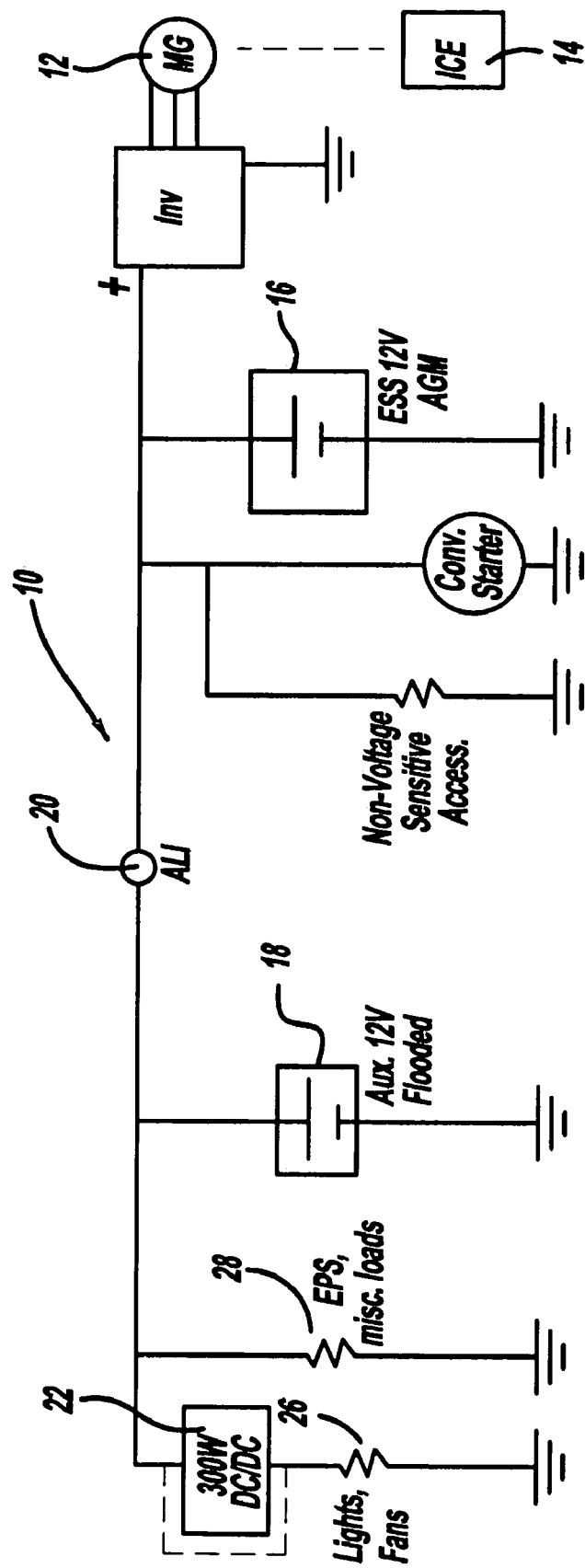

_US 7,389,837 B2_

ELECTRIC POWER CONTROL SYSTEM FOR A HYBRID VEHICLE

TECHNICAL FIELD

The present invention relates to the power control system for a hybrid powertrain. More specifically the present invention relates to a single-voltage electric power control system for a hybrid powertrain.

BACKGROUND OF THE INVENTION

The increasing demand to improve fuel economy, eliminate emissions, and reduce noise levels has driven the automotive market to develop a variety of propulsion mechanisms. As an alternative to the traditional internal combustion engine (ICE) powertrain the industry has developed a hybrid electric system powered by an electric traction motor(s) and an internal combustion engine. During varying driving conditions, hybrid electric vehicles (HEVs) will alternate between the separate power sources, depending on the most efficient manner of operation of each source.

A HEV may contain either a parallel drivetrain configuration or a series drivetrain configuration. Either of the configurations allows the ICE to perform relatively more efficiently than its conventional ICE counterpart. In a parallel hybrid vehicle the electric motor works in parallel with the ICE to combine the power and range advantages of the ICE with the efficiency and the electrical regeneration capability of an electric motor. The ICE drives the wheels through a transaxle. In a series hybrid vehicle, the ICE drives a generator to produce electricity for the electric motor, which drives the transaxle. This allows the electric motor to assume some of the power responsibilities of the ICE, thereby permitting the use of a smaller and more efficient ICE. An exemplary hybrid vehicle is described in U.S. Pat. No. 6,275,004 entitled "System for Battery Module Balancing via Variable Voltage DC/DC Converter In a Hybrid-Electric Powertrain, and U.S. Pat. No. 6,616,569 entitled "Torque Control System for a Hybrid Vehicle With an Automatic Transmission" both of which are incorporated by reference in their entirety.

In either parallel or series configuration, the electric motor/generator (MoGen) uses a combination of storage batteries to propel or drive the vehicle when the ICE is not operating. A hybrid vehicle will shut down the ICE during a stopped or idle condition, allowing the electric motor to propel the vehicle and eventually restart the ICE. Battery packs having secondary/rechargeable batteries are an important component of hybrid vehicle systems, as they enable the MoGen to store braking energy during regeneration and charging by the ICE.

To perform engine stop/start functions, relatively high electrical power is required to quickly crank the ICE from a stop. To achieve this function, a relatively higher voltage system (e.g. 36V) can be implemented for the MoGen bus, coupled with separate conventional 12V system to support the existing accessory loads. However, to reduce complexity, vehicle modifications, and possible component/system cost, a single voltage hybrid system can be considered. That single-voltage can be 12V or 42V, depending on the voltage/power requirement of a HEV and its accessories.

If a hybrid system is implemented into a conventional 12V electrical system, the voltage swings during dynamic Engine-Stop-Start (ESS) functions and engine stops (at idle) could be unsatisfactory. For example, when performing ESS functions, the large power draw results in large voltage swings. These voltage dips and surges result in customer distractions such as undulating headlights/dashlights and blower speed. These voltage swings can also present a performance issue if the battery or battery pack (already strained from ESS action) is needed to support accessories such as Electric Power Steering (EPS). Thus, for a single-voltage hybrid system to be viable, the present invention utilizes an additional power source consisting of either an auxiliary battery or an auxiliary battery combined with a DC/DC converter.

SUMMARY OF THE INVENTION

The present invention includes a method and apparatus to improve the pleasability and performance for a single-voltage hybrid system. The system may include a vehicle having both parallel and series hybrid drive systems incorporating an ICE, MoGen and a battery pack. The hybrid drive system of the present invention will utilize the ICE and MoGen to propel or motor the vehicle during the vehicle conditions which are most efficient for the ICE or MoGen operation. During normal operation of the vehicle when the ICE is running, the MoGen may act as an electrical generator to supply electrical power to the vehicle's electrical infrastructure (fans, radios, instrumentation, control, etc.) as well as recharging the battery pack.

In the preferred embodiment of the present invention, the battery pack is comprised of two single-voltage batteries. The second battery is connected in parallel with an accessory load isolator (ALI) to actively decouple the hybrid-related power flow from the voltage-sensitive accessory power flow. A DC/DC converter may also be used to bypass the power during the vehicle cruising/charging conditions to enhance system efficiency. The output voltage of the DC/DC converter can be ramped to converge with the charging bus voltage, before the bypass is executed.

BRIEF DESCRIPTION OF THE DRAWINGS

The FIGURE is a diagrammatic drawing of the hybrid vehicle system of the present invention.

DESCRIPTION OF THE PREFERRED EMBODIMENT

The FIGURE is a diagrammatic drawing of a hybrid vehicle system 10 of the present invention. A motor generator (MoGen) 12 is dynamically coupled to an internal combustion engine (ICE) 14 and functions as either a motor to propel the vehicle or a generator to charge a battery pack, depending on the operating state of the vehicle (i.e. braking, stopped, or operating at a constant speed on a highway). The MoGen 12 is preferably an AC induction machine but may comprise any known electrical motor/generator technology, including, but not limited to, DC machines, internal permanent magnet motors, brushless motors, synchronous machines, and switched reluctance machines.

In the preferred embodiment, the battery pack is comprised of two 12 volt batteries. The battery types used in the present invention include, but are not limited to, lead-acid, nickel metal hydride, lithium ion, lithium polymer, or any other battery technology that may be used in a vehicle. In the preferred embodiment of the present invention, one ESS 12 volt 16 absorbent lead-acid glass mat (AGM) type battery 16 is connected to the positive and ground terminals of a power electronics box (PEB) (not shown). Then a second and preferably smaller, less expensive, flooded type auxiliary battery 18 is connected in parallel via a switch 20 and miscellaneous loads 28 such as EPS and brake by wire. The switch 20 may comprise a transistor (FET, BJT, IGBT), electromechanical relay, thyristor (SCR, Triac), or any other electrical switching device known in the art, to isolate the auxiliary battery 18 from the ESS battery 16. The switch is controlled by an electronic control module (ECM) that monitors the voltage and current of the system.

This switch 20 is defined as the ALI (Accessory Load Isolator) in the present invention. In the preferred embodiment, a relatively small DC/DC converter (~300 W) 24 is implemented for the voltage-sensitive loads only such as lights, fans, and other accessory loads 26. For enhanced efficiency, a DC/DC bypass line can be used during non-ESS driving. In an alternative embodiment, no DC/DC converter is necessary, as the auxiliary battery 18 will power the vehicle accessories.

When any hybrid activity that requires a relatively large battery power discharge is called, or if the ICE 14 is stopped, the ALI 20 opens, so that during the current spikes or steady draws on the ESS battery 16, the accessories' performance will not dip or undulate. The ALI 20 can also be opened for relatively large regenerative braking pulses, depending on the auxiliary battery characteristics 18. In an alternative embodiment of the present invention, the opening of the ALI 20 can be preceded by a ramping down of the system voltage; thus the accessory system voltage reduction from generating (e.g. 13.5 V during cruising) to 12.5 during idle-stop can be perceived by the drive as an unobjectionable low-frequency undulation, rather than a noticeable spike.

The present invention will allow large current spikes to be decoupled from an already highly loaded 12V ESS battery. Since both starters are controlled by an ECM, the tandem crank start can still be implemented for cold starts. During cold or weak-battery key crank events, the ALI 20 isolates the ECM from the large voltage dips of the ESS/starter battery. Depending upon power applications in the vehicle, the auxiliary battery 18 may be sized to minimize voltage drop during the idle-stop, the non-voltage sensitive accessory loads can be moved to run off the auxiliary battery 18 in alternate embodiments of the present invention.

It is to be understood that the invention is not limited to the exact construction illustrated and described above, but that various changes and modifications may be made without departing from the spirit and scope of the invention as defined in the following claims.

The invention claimed is:

1. A vehicle powertrain control system comprising:
    an electric motor drive system;
    an internal combustion engine operatively coupled to said electric motor drive system;
    a first battery coupled to said electric motor drive system;
    an electronically controlled switch coupled to said first battery;
    a second battery coupled to said electronically controlled switch, wherein said first and second battery are directly electrically coupled at a common voltage level when said electronically controlled switch is closed;
    wherein said electronically controlled switch isolates said first battery from said second battery upon startup of said internal combustion engine; and
    wherein said electronically controlled switch applies power from said second battery to supplement said first battery during select operating conditions.

2. The vehicle powertrain control system of claim 1 further comprising a DC/DC converter coupled to said electronically controlled switch, wherein said electronically controlled switch applies power from said DC/DC converter to supplement said second battery.

3. The vehicle powertrain control system of claim 1 wherein said electric motor drive system comprises an inverter coupled to an induction motor.

4. The vehicle control system of claim 1 wherein said first battery comprises a lead acid battery.

5. The vehicle control system of claim 1 wherein said second battery comprises a lead acid battery.

6. The vehicle control system of claim 1 wherein said electronically controlled switch comprises a silicon conducting rectifier.

7. The vehicle control system of claim 1 wherein said electronically controlled switch comprises a transistor.

8. The vehicle control system of claim 1 wherein said electronically controlled switch comprises an electromechanical relay.

9. A vehicle powertrain control system comprising:
    an electric motor drive system;
    an internal combustion engine operatively coupled to said electric motor drive system;
    a first battery coupled to said electric motor drive system;
    a second battery coupled to a vehicle accessory system;
    an electronically controlled switch coupled to said first battery and said second battery;
    a DC/DC converter coupled to said electronically controlled switch;
    wherein said electronically controlled switch applies power from said DC/DC converter to supplement said first battery, and wherein said DC/DC converter, said first battery, and said second battery share a common electrical reference when said electronically controlled switch is closed; and
    wherein said electronically controlled switch isolates said first battery from said second battery during starting of said internal combustion engine.

10. The vehicle powertrain control system of claim 9 wherein said electric motor drive system includes an inverter.

11. A vehicle powertrain control system comprising:
    an electric motor drive system;
    a first battery coupled to said electric motor drive system;
    an electronically controlled switch coupled to said first battery;
    a second battery coupled to said electronically controlled switch, wherein said first and second battery operate at substantially the same voltage at a common electrical connection when said electronically controlled switch is closed;
    wherein said electronically controlled switch applies power from said second battery to supplement said first battery during a first operating condition; and
    wherein said electronically controlled switch isolates said first battery from said second battery upon startup of said internal combustion engine.

* * * * *